(12) United States Patent
Scalzo

(10) Patent No.: US 9,631,550 B2
(45) Date of Patent: Apr. 25, 2017

(54) INTERNAL COMBUSTION ENGINE WITH ASYMMETRIC PORT TIMING

(71) Applicant: SCALZO AUTOMOTIVE RESEARCH PTY LTD, Kew, Victoria (AU)

(72) Inventor: Joseph Scalzo, Kew (AU)

(73) Assignee: Scalzo Automotive Research PTY LTD, Kew, Victoria (AU)

( * ) Notice: Subject to any disclaimer, the term of this patent is extended or adjusted under 35 U.S.C. 154(b) by 84 days.

(21) Appl. No.: 14/646,665

(22) PCT Filed: Nov. 21, 2013

(86) PCT No.: PCT/AU2013/001340
§ 371 (c)(1),
(2) Date: May 21, 2015

(87) PCT Pub. No.: WO2014/078894
PCT Pub. Date: May 30, 2014

(65) Prior Publication Data
US 2015/0300242 A1    Oct. 22, 2015

(30) Foreign Application Priority Data
Nov. 22, 2012   (AU) ................ 2012905081

(51) Int. Cl.
*F02B 75/22*   (2006.01)
*F16H 23/00*   (2006.01)
(Continued)

(52) U.S. Cl.
CPC .............. *F02B 25/08* (2013.01); *F01B 9/026* (2013.01); *F02B 37/00* (2013.01); *F02B 75/24* (2013.01);
(Continued)

(58) Field of Classification Search
CPC ........ F02B 25/08; F02B 37/00; F02B 75/024; F02B 75/32; F02B 33/00; F02B 39/10;
(Continued)

(56) References Cited

U.S. PATENT DOCUMENTS 3,207,138 A    9/1965   Brown
6,170,443 B1   1/2001   Hofbauer

FOREIGN PATENT DOCUMENTS

| GB | 861811  | 3/1961  |
| GB | 1028471 | 5/1966  |
| WO | 9635041 | 11/1996 |

OTHER PUBLICATIONS

International Searching Authority, "International Search Report and Written Opinion," issued in connection with International Patent Application No. PCT/AU2013/001340, on Jan. 29, 2014, 5 pages.

(Continued)

*Primary Examiner* — Carlos A Rivera
*Assistant Examiner* — Syed O Hasan
(74) *Attorney, Agent, or Firm* — Hanley, Flight & Zimmerman, LLC

(57) ABSTRACT

An internal combustion engine enabling asymmetric port timing has an engine mechanism including a crankshaft having a crankpin to which each piston of an opposed pair of pistons is connected and by which the pistons are reciprocatable in a respective one of axially inline cylinders. The mechanism also includes a crosshead having opposite ends on each of which a respective piston is mounted, and a coupling between the crosshead and the crankpin by which the pistons are caused to oscillate circumferentially as the pistons are driven to reciprocate.

15 Claims, 13 Drawing Sheets

(51) Int. Cl.

| | | |
|---|---|---|
| *F01B 3/00* | (2006.01) | |
| *F02F 3/00* | (2006.01) | |
| *B23P 15/10* | (2006.01) | |
| *F02B 25/08* | (2006.01) | |
| *F02B 75/24* | (2006.01) | |
| *F02B 75/32* | (2006.01) | |
| *F16C 5/00* | (2006.01) | |
| *F16C 11/02* | (2006.01) | |
| *F02B 37/00* | (2006.01) | |
| *F01B 9/02* | (2006.01) | |
| *F02B 33/00* | (2006.01) | |
| *F02B 39/10* | (2006.01) | |
| *F02B 75/02* | (2006.01) | |

(52) U.S. Cl.
CPC ............... *F02B 75/32* (2013.01); *F16C 5/00* (2013.01); *F16C 11/02* (2013.01); *F02B 33/00* (2013.01); *F02B 39/10* (2013.01); *F02B 2075/025* (2013.01); *F02B 2730/02* (2013.01)

(58) Field of Classification Search
CPC  F02B 2075/025; F02B 2730/02; F01B 9/026; F16C 5/00; F16C 11/02
USPC ......... 123/53.1, 53.3, 55.2, 55.5, 55.7, 45 R, 123/193.6; 74/60, 839; 29/888.04
See application file for complete search history.

(56) References Cited

OTHER PUBLICATIONS

International Preliminary Examining Authority, "International Preliminary Report on Patentability," issued in connection with International Patent Application No. PCT/AU2013/001340, on Nov. 7, 2014, 5 pages.

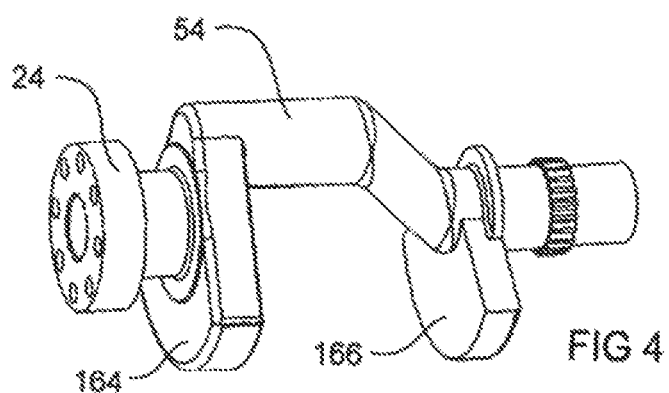
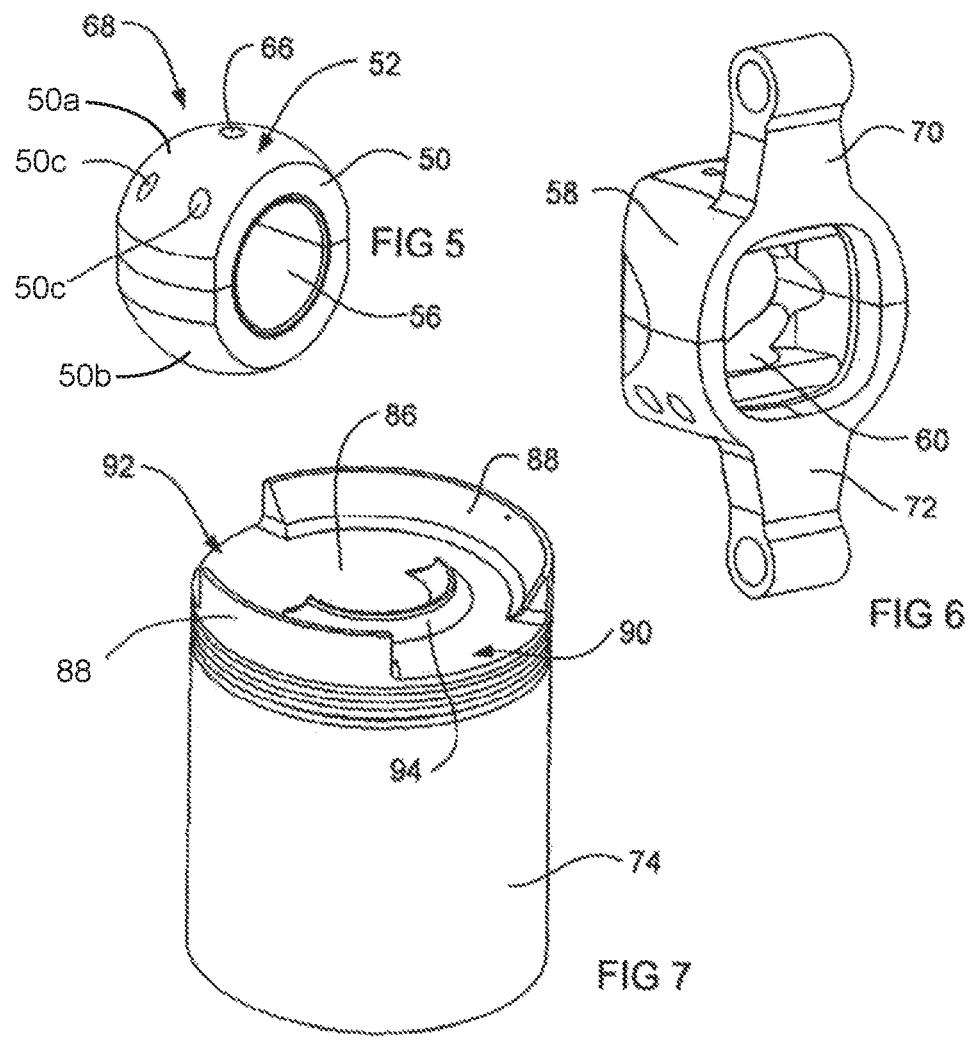

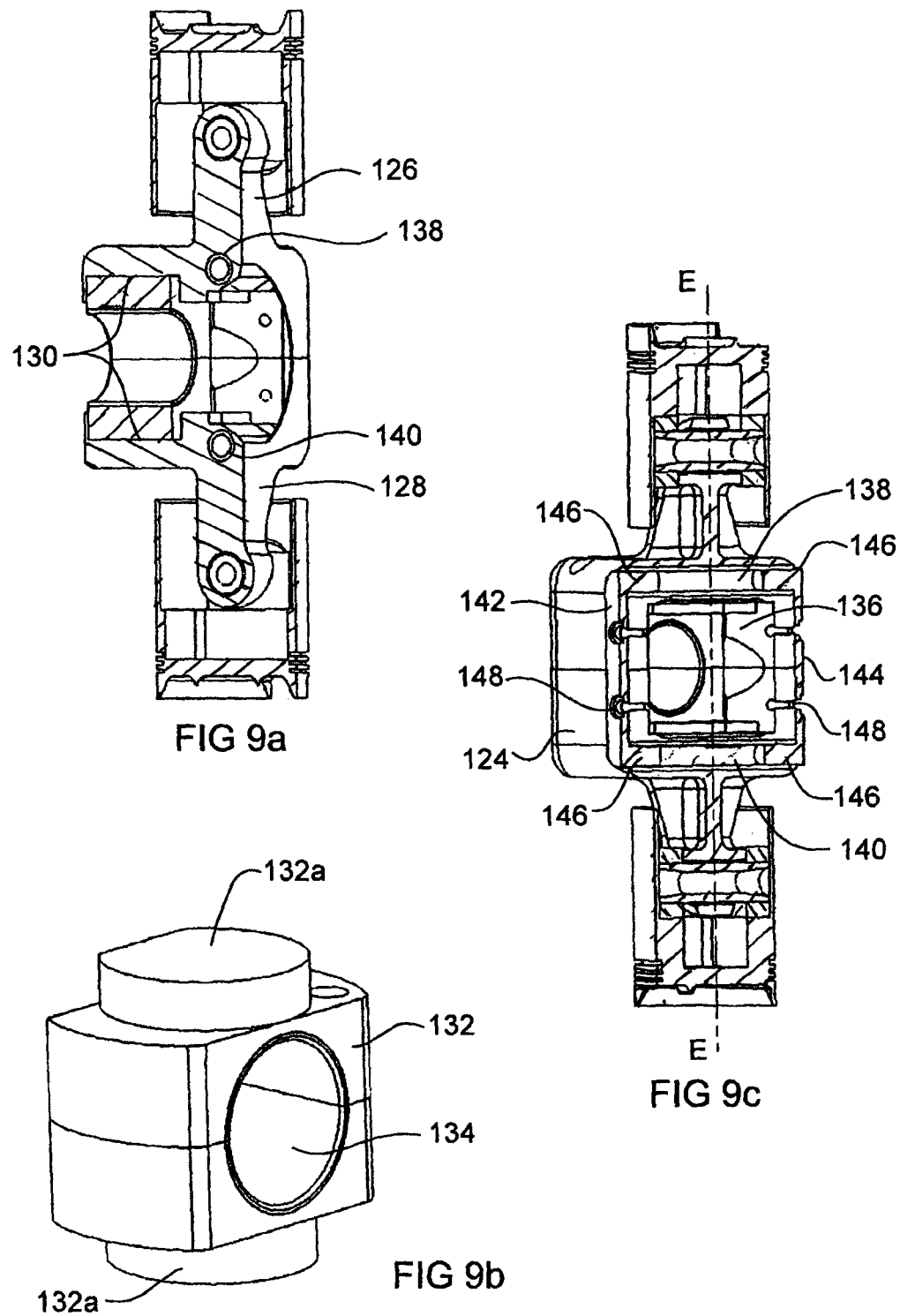

INTERNAL COMBUSTION ENGINE WITH ASYMMETRIC PORT TIMING

RELATED APPLICATION

This patent arises from a U.S. national Stage of International Patent Application Serial No. PCT/AU2013/001340, having an International Filing Date of Nov. 21, 2013. International Patent Application Serial No. PCT/AU2013/001340 claims priority to Australian Patent Application Serial No. 2012905081, filed on Nov. 22, 2012. International Patent Application Serial No. PCT/AU2013/001340 and Australian Patent Application Serial No. 2012905081 are incorporated herein by reference in their entities.

TECHNICAL FIELD

The present invention relates generally to two-stroke internal combustion engines, and more specifically to a crank-piston mechanism to allow the piston to generate an elliptical motion within the cylinder as it moves from top dead centre to bottom dead centre. This elliptical motion of the piston allows asymmetric port timing to be achieved, an essential requirement for a highly efficient two-stroke internal combustion engine.

BACKGROUND OF INVENTION

In a ported two-stroke IC engine the piston serves to open and close the inlet and exhaust ports located circumferentially in the cylinder. One or more of these ports provide passage for a fresh charge of air or air/fuel mixture to the cylinder and one or more other ports provide exhaust of the combusted gases. The inlet ports and the exhaust ports are arranged around the cylinder so that on the downward movement of the piston the exhaust ports are uncovered first to allow the high pressure gases to escape to the atmosphere via exhaust pipes to achieve blow-down. On further downward motion of the piston the inlet ports are uncovered to allow fresh charge of pressurized air or air/fuel mixture to be delivered to the cylinder for combustion after undergoing a compression cycle. The pressurized gases also serve to force combusted gases from the cylinder, a process known as scavenging.

In conventional two-stroke IC engines, the opening of the exhaust ports and the inlet ports is symmetrical which means that the exhaust ports open first followed by the opening of the inlet ports on the downward movement of the piston, however on the upward movement of the piston the inlet ports close first followed by the closure of the exhaust ports. This action allows some of the pressurized fresh air or air/fuel mixture to escape while the exhaust port is open. This process prevents the two-stroke IC engine from being able to be supercharged or turbocharged.

Modern engines are required to be fuel efficient as well as low in exhaust emissions and for two-stroke engines to be successful in fulfilling these two criteria it is important to achieve asymmetric port timing. This means that the exhaust port must open first for the blow-down process, followed by the opening of the inlet port for the scavenging and charging process. During the upward motion of the piston, the exhaust port closes first to prevent fresh charge from escaping after the scavenging has been completed, followed by the closure of the inlet port. The period between exhaust port closure and inlet port closure is used to complete the charging cycle and, if desired, provide supercharging. It is further desirable to provide the scavenging and charging by the use of a engine driven air blower commonly known as a supercharger. In addition, this will allow the engine to have a wet sump in a similar manner to a four stroke IC engine.

There are various known forms of achieving asymmetric port timing in two-strokes. However these generally involve complex arrangements such as that described in U.S. Pat. No. 6,170,443 to Hofbrauer in which two opposed pistons operate in one cylinder with each piston phased with respect of the other such that one piston uncovers the inlet port while the other piston uncovers the exhaust port. Another opposed piston engine is the Junkers Jumo engine in which two crankshafts were used on either end of the engine and coupled together by chains or gearing slightly out of phase with each other to achieve the port asymmetry. Similar arrangements were used in the Napier Deltic and Rootes two-stroke engines. Another form used a combination of ports and poppet valves for the inlet and exhaust respectively. Other forms include the U-cylinder, the sleeve valve arrangement and opposed cam engines. In each of these alternative arrangements additional complex mechanisms contribute to additional friction losses and bulk negating the benefits of two-stroke engines.

SUMMARY OF INVENTION

It is the object of the present invention to provide an opposed cylinder mechanism suited for a two-stroke IC engine but also adaptable for use in a four-stroke internal combustion engine.

Accordingly, the present invention provides an engine mechanism that includes a crankshaft having a crankpin to which each piston of an opposed pair of pistons is connected and by which the pistons reciprocate in a respective one of axially inline cylinders. The mechanism further includes an elongate crosshead having opposite ends on each of which a respective one of the pistons is mounted, and a coupling between the crosshead and the crankpin by which the pistons are caused to oscillate circumferentially as the pistons are driven to reciprocate.

The coupling between the crosshead and the crankpin can take a variety of forms, depending in part on the form of the crankshaft. The coupling may be provided by a member that is fitted on, and able to move along, the crankpin. In one form, the member may be in the form of a yoke through which the crankpin extends, with a bearing provided between a bore through the yoke and the crankpin. For a crankshaft able to be supported for rotation by a shaft section beyond each end of the crankpin, the yoke may be of a two-part form enabling it to be fitted onto the crankpin. However, with a crankshaft that it is supportable for rotation by such a shaft section at only one end of a crankpin defining one end of the crankshaft, the yoke can be of one piece construction and define a bore into which the crankpin can be received endwise. However, there are still other forms that a member providing the coupling between the crosshead and the crankpin can take. Principle requirements for that member are that it be reversibly moveable along the crankpin and that it engages the crosshead so as to be reversibly rotatable relative to the crosshead on an axis that is parallel to and laterally offset from an axis along which the pistons reciprocate. Thus, for example, with a crankshaft having a crankpin rotatable on its own axis as the crankshaft rotates, the member providing the coupling between the crosshead and the crankpin could be of a form having an elongate body portion which extends through a longitudinal slot in the crankpin and which has opposed ends by which it bears against complementary surfaces of the crosshead to enable relative rotation, between the coupling member and the crosshead, on an axis parallel to and laterally offset from the axis on which the pistons reciprocate.

An engine mechanism according to the invention may utilise a crankshaft, such as a single throw crankshaft, on which at least one opposed pair of pistons is rigidly or flexibly connected, forming an offset crosshead, with the pistons journalled. The yoke member may engage with the crosshead via spherical, conical or flat bearing surfaces. The offset crosshead-yoke geometry imparts a partial rotary motion to the pistons as they reciprocate in opposed cylinders on a common same axis. The overall motion of the pistons resulting from the partial rotary motion as the pistons reciprocate produces an elliptical path for each piston in the respective cylinder. As a consequence, the arrangement can be adapted to provide or control opening and closing of charging and exhaust ports of each cylinder such that asymmetric port timing is can be developed. Asymmetric port timing has the important advantage of making it possible to utilize superchargers, with or without the assistance of turbochargers, to enhance engine efficiency, a benefit that has long been sought after for two-stroke engines.

A multi cylinder engine having multiples of two in a boxer formation can be produced. Each configuration requires a different balancing arrangement. In a two cylinder opposed engine force balancing is required in the plane of the cylinders. In this configuration two balance shafts, running at engine speed but in opposite direction, are positioned in a plane perpendicular to the cylinder plane and create substantially perfect balance. In a four-cylinder configuration, for example, only one balance shaft is required to counteract the couple unbalance in the one plane. The detailed description of the invention covers the balancing requirement for each configuration. However, in certain applications and with carefully designing of the piston masses and the portion crosshead together with the yoke member, balance shafts may not be necessary, particularly in small capacity engines.

Although this invention is primarily orientated towards two-stroke engines, the mechanical arrangement between the pistons and the crankshaft can also be applied to four stroke engines combined with the appropriate head containing poppet valves and camshaft drive.

A two-stroke IC engine according to the invention is able to have comparable performance characteristics to current four stroke engines of comparable size. However, the two-stroke IC engine is able to achieve these comparable characteristics with improved benefits in increased efficiency, reduced size and lower weight. At least in preferred forms, the invention enables the adaptability of advanced supercharging and direct fuel injection systems, substantially total dynamic balance, and mechanical simplicity for reduced production costs.

To facilitate attainment of asymmetric port timing, the pistons are provided with a modified crown formation that functions in combination with the elliptical piston movement. In one arrangement, the formation includes or comprises a segmented skirt formation projecting beyond the crown, provided around the perimeter of the crown to form two arcuate, circumferentially spaced skirts. The skirts are at opposite sides of the crown, but one may be of lesser arcuate extent than the other. One skirt may have an arcuate extent of about 140 to 170 degrees, with the other skirt having an arcuate extent of about 70 to 85 degrees, although the skirt of lesser arcuate extent can be eliminated in many applications. The crown has a pair of opposed openings, each between a respective one of two sets of circumferentially nearer ends of the skirts. The opposed openings may be of similar arcuate extent. One of the openings is an inlet that co-operates with the inlet port, while the other opening is an outlet and co-operates the exhaust port. The height of the skirts is governed by the asymmetric characteristics required for the engine. Inwardly from the skirts, the crown may have a deflector bar which extends across the ends of the skirts between which the inlet opening is formed, with the bar having a height sufficient to deflect incoming air from any scavenge pump fitted to the engine.

An engine according to the invention also may be configured by with a power piston on one side, and a compressor piston on the opposite side, to eliminate the need for a separate engine driven supercharger. In that configuration the outlet of the compressor is linked to the inlet of the power cylinder via an air duct. The compressor piston may be of a larger diameter than the power piston to provide supercharging. Thus, one of the opposed pair of pistons may be operatable as a power piston and the other piston of the pair is operatable as a compressor piston, such as with the compressor piston having a cylinder of larger bore size than the cylinder of the power piston, and the compressor cylinder optionally having an inlet port and an outlet port with each of the ports of the compressor cylinder controlled by reed valves. In such an arrangements, the wherein compressor cylinder during an induction stroke may have its inlet port open to atmospheric air and its outlet port closed, and during a compression stroke its inlet port may be closed and its outlet port which compressed air is able to be transferred to the inlet port of the power cylinder, with the duct having a volume enabling it to act as an accumulator of compressed air after the inlet port of the power cylinder closes.

BRIEF DESCRIPTION OF DRAWINGS

Preferred embodiments of the present invention will now be described with reference to the accompanying drawings in which:

FIGS. 4 to 7 are isometric views of respective components of the engine of FIG. 1;

FIG. 9a is an isometric cross-section of the sub-assembly of the engine of FIG. 9;

FIG. 9b is an isometric view of a component of the engine of FIG. 9;

FIG. 9c is an isometric cross-section of the sub-assembly shown in FIG. 9a;

DETAILED DESCRIPTION

Figure 1:
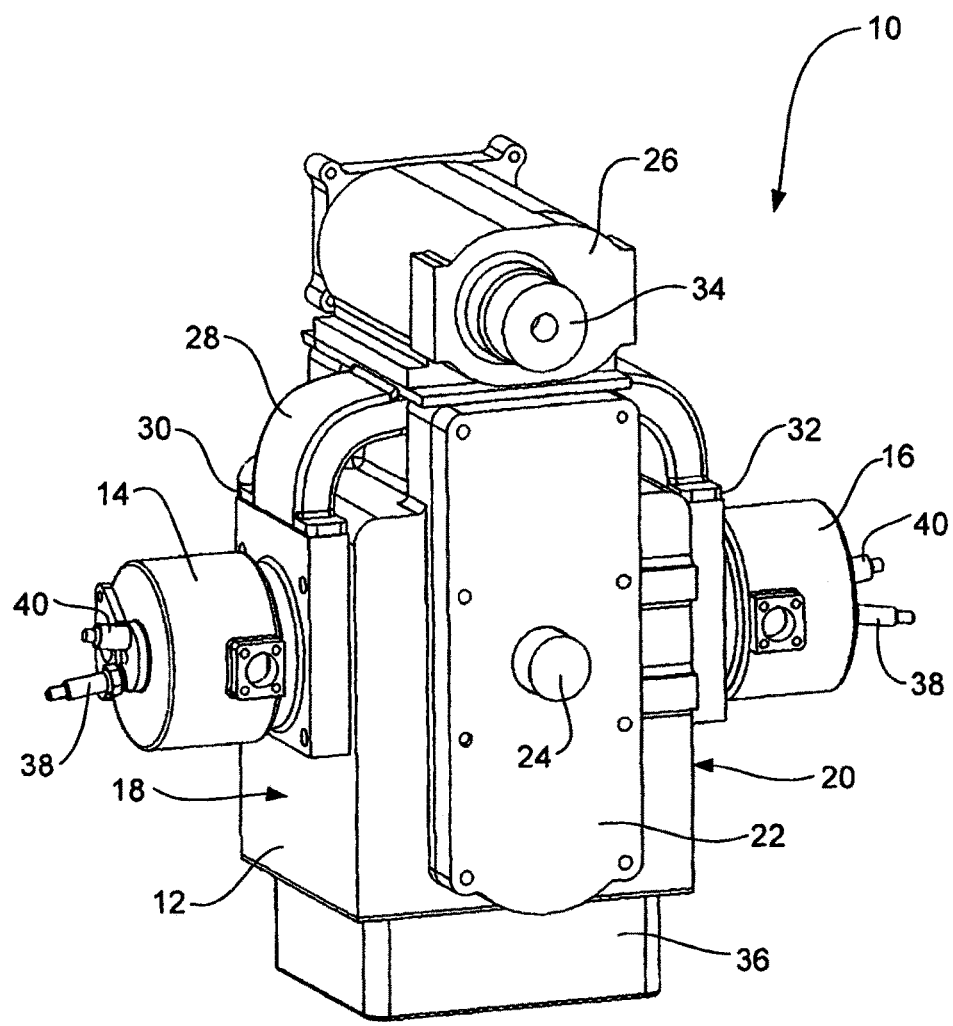
FIG. 1 is an external representation of a first embodiment of a two cylinder opposed two-stroke IC engine configuration of the present invention.

FIG. 1 illustrates the external arrangement of engine 10 according to a first embodiment of the present invention. The engine 10 has a crankcase 12 on which two cylinders 14 and 16, with integral heads, are mounted on opposite faces 18 and 20 respectively in a horizontally disposed boxer arrangement. A front cover 22 encloses balance gears (not shown) and seals a crankshaft 24. A blower or supercharger 26 is mounted in a suitable position to allow air charging via a bifurcated manifold 28 to a respective inlet port 30 and 32 of cylinders 14 and 16. The supercharger 26 has a drive shaft 34 which could normally be driven by the crankshaft 24 of engine 10, via a belt or chain (not shown). However, instead of such drive, an electric motor or a hydraulic motor could be used for independent drive for shaft 34. An oil sump 36 completes the envelope for engine 10. A sparkplug 38 and direct fuel injector 40 is fitted to the head of each cylinder 14 and 16.

FIGS. 2 to 7 in combination illustrate the internal drive assembly and the major components of engine 10. These Figures show crankshaft 24 journalled in the crankcase 12 by journal bearings 42 and 44 and axially located by thrust bearings 46 and 48 against crankcase 12. A split yoke 50 with an outer spherical bearing surface 52 is journalled on the crankpin 54 of crankshaft 24. The parts 50a and 50b of yoke 50 are joined on a parting plane by pins (not shown) inserted into aligned bores 50c of parts 50a and 50b. The yoke 50 is both rotatable on and slideable along a crankpin 54 of crankshaft 24, via bearing 56. Yoke 50 is a neat fit within a two-part crosshead 58 that has a centrally located spherical mating surface 60 that is complementary to the spherical surface 52 of yoke 50. Pins 62 and 64 couple yoke 50 and crosshead 58, and allow pivoting of the yoke 50 relative to the crosshead 58 along axis A-A parallel to and offset from the centre-line axis B-B of engine cylinders 14 and 16 by a distance X. Pins 62 and 64 may be fixed on opposite ends of crosshead 58 and journalled into the pin connection 66 and 68 of yoke 50. The axis A-A is in a plane parallel to axis B-B, and also perpendicular to crankpin 54.

In one arrangement, the yoke has a spherical outer surface and be receivable into a cavity of complementary spherical form defined by the crosshead. In that arrangement, the yoke may be receivable sideways into the cavity, with the yoke then rotated as required for alignment of the bore of the yoke with the crankpin.

Crosshead 58 has oppositely extending arms 70 and 72 on each of which a respective piston 74 and 76 is mounted. Each of pistons 74 and 76 is mounted in opposed relation to each other via a respective gudgeon pin 78 and 80 pivotally linking the outer end of each arm with a respective mounting block 82 and 84 fixed on piston 74 and 76. The axes of the gudgeon pins 78 and 80 are parallel to each other and perpendicular to the axis of the crankshaft 24. The gudgeon pins 78 and 80 and the connection to the pistons 74 and 76 respectively allow for any distortion or bending of the crosshead during the power stroke in a plane perpendicular to the crankshaft 24, and prevent excessive loads being placed on the skirts of pistons 74 and 76.

Each piston 74 and 76 has a crown 86 of a form seen most clearly for piston 74 in FIG. 7. The periphery of crown 86, for each of pistons 74 and 76, has two diametrically opposed, arcuate skirts 88 which have a height above crown 86 that is governed by asymmetric characteristics that are desired in an engine. The arcuately shorter of the two skirts 88 may be eliminated in certain designs, as described later herein and shown in FIG. 18. Between skirts 88 there is an inlet slot 90 and, diametrically opposed to slot 90, an exhaust slot 92. Also, radially inwardly from and across slot 90, crown 86 has a deflector bar 94 which is shown as semi-circular, although it can be of other elongate forms, such as linear. The bar 94 is placed opposite the inlet port 90 to deflect the incoming air supply from the scavenge pump (supercharger) 26 to assist in scavenging the exhaust gases and in charging the respective cylinder with fresh air. The skirt 88 on either side of slots 90 and 92 can have different heights depending on the asymmetric characteristics desired.

In operation, each of pistons 74 and 76 has a stroke determined by the throw of the crankpin 54 from the axis of crankshaft 24. The pistons 74 and 76 are connected by crosshead 58 and oscillate in their respective cylinders, 14 and 16 in unison along axis 8-8. The motion of the pistons 74 and 76 is transferred to the crankshaft 24 via the yoke 50 and by the offset X between the axis B-B and the axis A-A of yoke 50. This motion creates a symmetrical elliptical path of the pistons 74 and 76 as they move from their top dead centre to bottom dead centre positions. In effect, the pistons 74 and 76 oscillate circumferentially around the axis B-B through an angle determined by the offset X as they complete a cycle of reciprocation along axis B-B. This motion allows the each inlet slot 90 of each piston 74 and 76 to sweep both rotationally and linearly move over the inlet ports 30 and 32 and, similarly allows the outlet slot 92 to sweep both rotationally and linearly over a respective exhaust port 96 and 98 located at the lower portion of the cylinders 14 and 16. The positioning of the inlet and exhaust ports 30 and 96 of cylinder 14 in relation to the positioning of the piston slots 90 and 92 are chosen to enable the two-stroke engine 10 to achieve the desired asymmetrical port timing and thereby achieve optimum fuel economy and increased power output. The desirable asymmetrical port timing enables the exhaust of the inlet ports on the downward path of the piston. On the upward path of the piston, the exhaust ports close first followed by the closure of the inlet port. This action assures that the cylinders are able to be fully charged with air and makes it possible for the engine to be supercharged. Direct fuel injection can then be applied and ignited from the spark plug via a conventional engine management system.

The asymmetrical port timing is further explained by reference to FIG. 13.

FIGS. 8, 8a, 8b and 8c illustrate a sub-assembly 99 for a two-stroke engine according to a second embodiment of the invention. The overall detail of sub-assembly 99 will be understood from the description in relation to engine 10 of the preceding Figures The principle difference in sub-assembly 99, compared with corresponding components of engine 10, is in an alternative arrangement for the piston connection to the crankshaft 24 and for the form of the crosshead and yoke. In other respects, an engine according to the second embodiment can be the same as in engine 10.

In sub-assembly 99, pistons 100 and 102 are rigidly connected, such as by bolts, to the two-part symmetrical crosshead 104 on a respective pair of posts 106 and 108, along axis C-C on which pistons 100 and 102 reciprocate. The crosshead 104 has an opposed pair of offset female conical surfaces 110 which are spaced from each other with their axes co-incident with an axis D-D that is parallel to and offset from an axis C-C along which pistons 100 and 102 are able to reciprocate. The surfaces 110 mate with a oppositely facing, complementary conical surfaces 112a of two part conical yoke 112 so that the yoke 112 is rotatable relative to crosshead 104. The conical yoke 112 is journalled on crankshaft 24 by bearing 114 that is rotatable on and able to slide along crankpin 68. A shaped opening 116 on one side of the crosshead allows clearance for the bent extension 118 of crankshaft 24 as the crosshead 104 swings vertically and horizontally through on revolution of the crankshaft 24.

The pistons 100 and 102 of sub-assembly 99 are similar to and functionally, the same as pistons 74 and 76 of engine 10. The operation and benefits of an engine according to the second embodiment, based on the sub-assembly 99, are the same as for engine 10.

FIGS. 9a, 9b, 9c and 9d a sub-assembly 117 for a two-stroke engine according to a third embodiment to the present invention. Again, the overall detail will be understood from the description of engine 10. The principle difference compared to components of engine 10 is in an alternative arrangement for the piston connection to the crankshaft and for the form of the crosshead and yoke. In other respects, an engine according to the third embodiment can be the same as in engine 10.

In the sub-assembly 117 for the third embodiment, pistons 120 and 122 are pin jointed to the respective arm 126 and 128 of two-part symmetrical crosshead 124, along axis E-E on which pistons 120 and 122 are able to reciprocate. The crosshead 124 has an opposed pair of offset female cylindrical bearing surfaces 130 each rotationally mating with a respective one of oppositely extending stub axles 132a of two part yoke 132. Each stub axle 132a of yoke 132 has a part cylindrical surface complementary to a surface 130 of crosshead 124. The crosshead 124 rotationally mates with yoke 132 so as to be rotatable on and along axis F-F parallel to and offset from axis E-E by a distance X. The yoke 132 is journalled on crankshaft 24 by bearing 134 that is able to rotate on and slide along crankpin 68.

Figure 9:
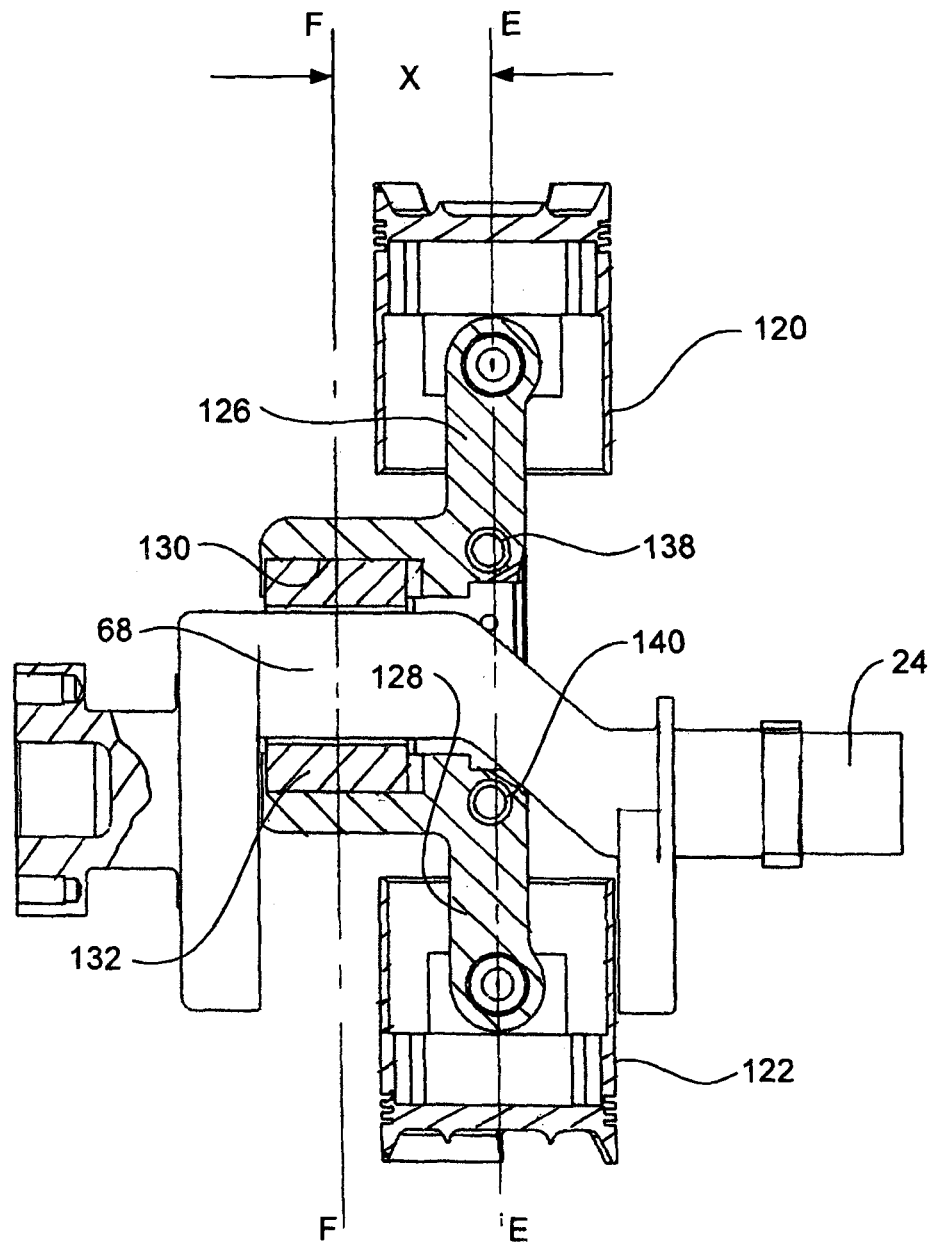
FIG. 9 is a cross-sectional view of sub-assembly for an engine mechanism according to a third embodiment of the invention.

FIG. 9c further illustrates a method of reinforcing the large opening 136 of crosshead 124 to allow the swing of the bent extension 118 of crankshaft 24. To minimize the mass of the crossheads described in the second and third embodiment, crossheads 104 and 124 can be made from a lightweight material such as aluminium. However the periphery of the opening of crosshead 124 directly in line with the centreline of the piston motion axes C-C and E-E may need reinforcement by a stronger material such as steel or a titanium alloy. The reinforcement is provided by, two steel tubes 138 and 140 inserted into a solid part of crosshead 124, perpendicularly to axis E-E, as shown. Two side-bars 142 and 144, that also can be made of steel, with integral pins 146 insert into the hollow section of tubes 138 and 140, and attached to the side of the crosshead 124 by screws 148, complete a reinforcing "ring".

Other combinations of spherical, conical and flat yokes and complementary mating surfaces of the crossheads may be used in engine embodiments or configurations according to the invention. Also, a variety of different arrangements can be used to provide connections between the pistons and crosshead.

FIGS. 2, 4 and 10 to 13 illustrate balancing requirements for the opposed two cylinder boxer engines. The general requirement for this type of engine is for two balance shafts running at engine speed but in the opposite direction to the crankshaft, placed on opposite side of the crankshaft in a plane perpendicular to the plane of the piston movement.

Figure 2:
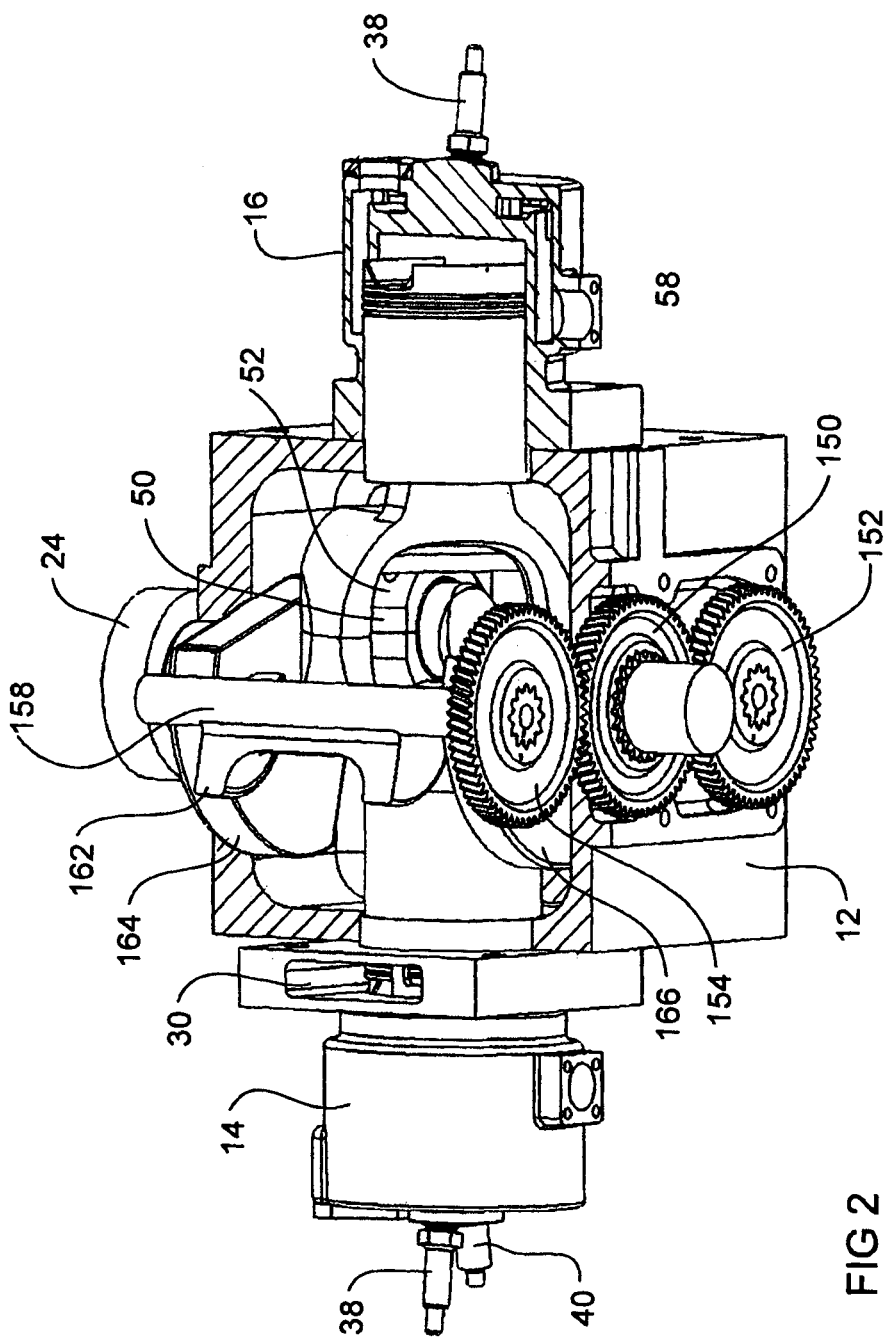
FIG. 2 is a partially sectioned perspective view of the engine of FIG. 1.
Figure 3:
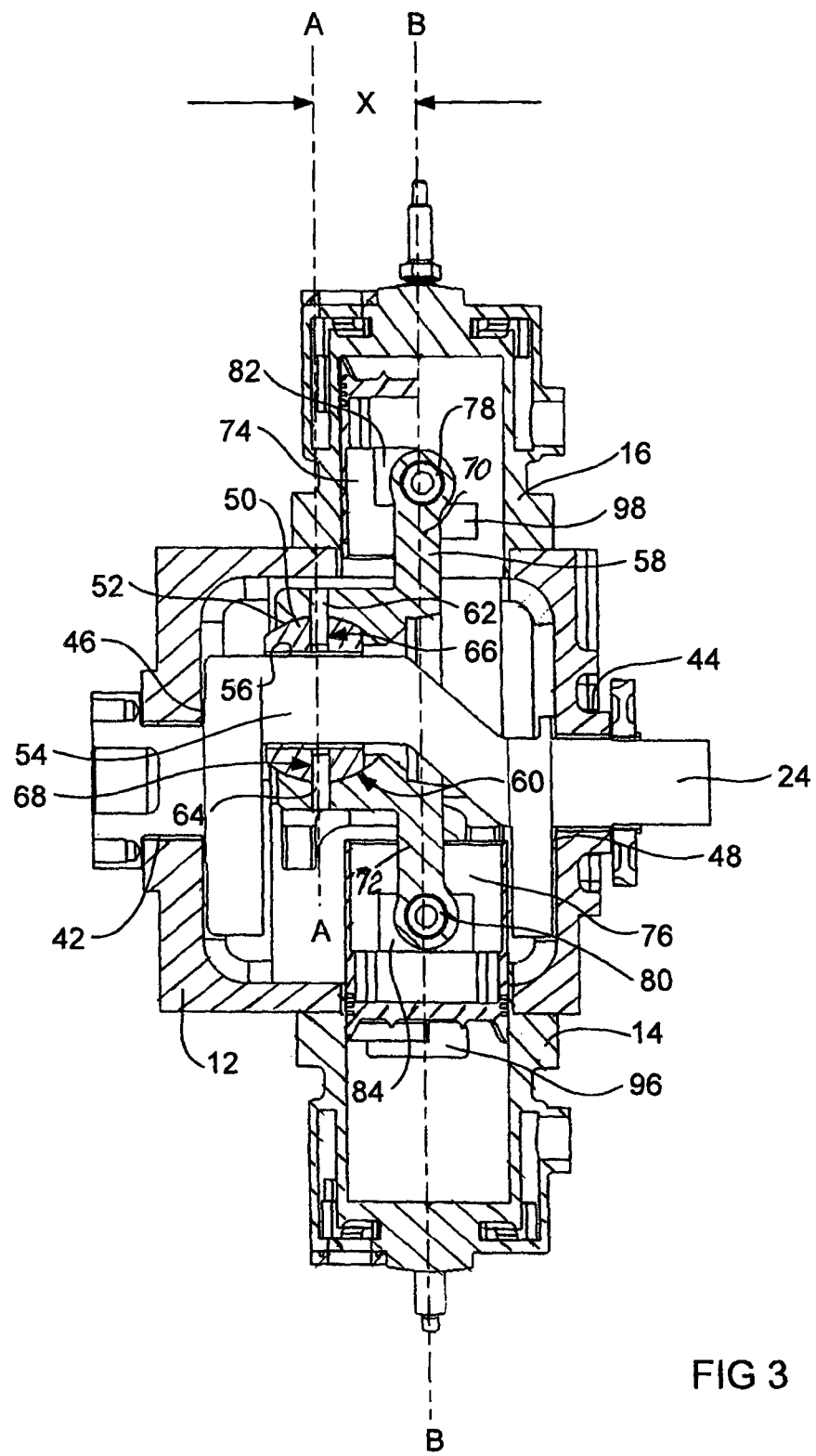
FIG. 3 is a cross-section of the engine of FIG. 1.
Figure 8:
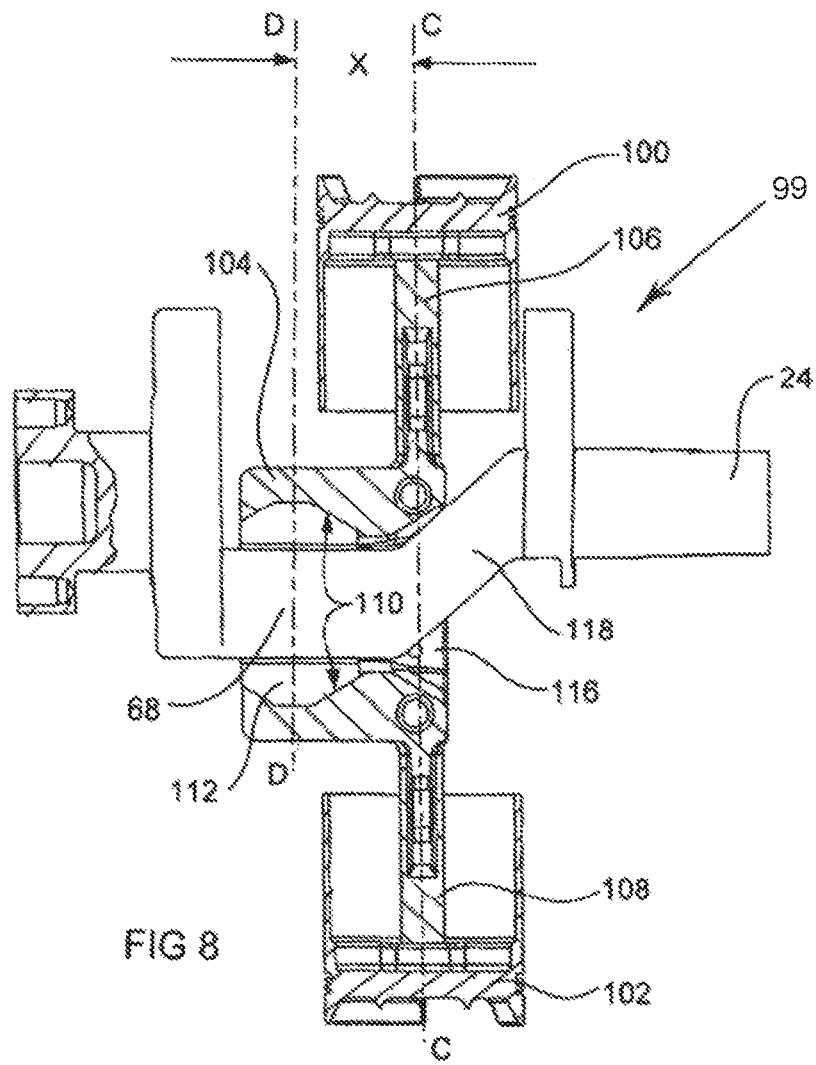
FIG. 8 is a cross-sectional view of a sub-assembly for an engine mechanism according to a second embodiment of the invention.
Figure 8A:
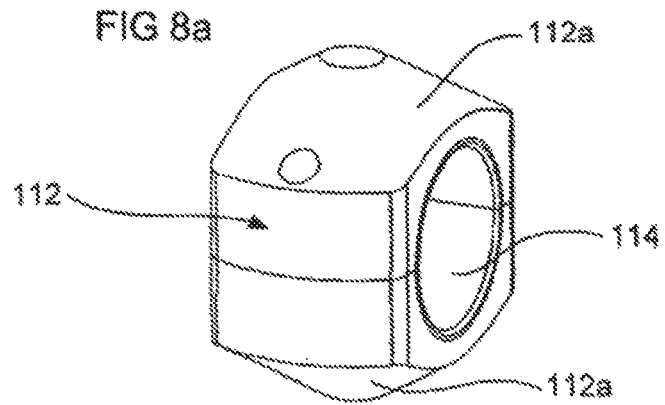
FIGS. 8a, b and 8c are isometric views of respective components of the engine of FIG. 8.
Figure 8B:
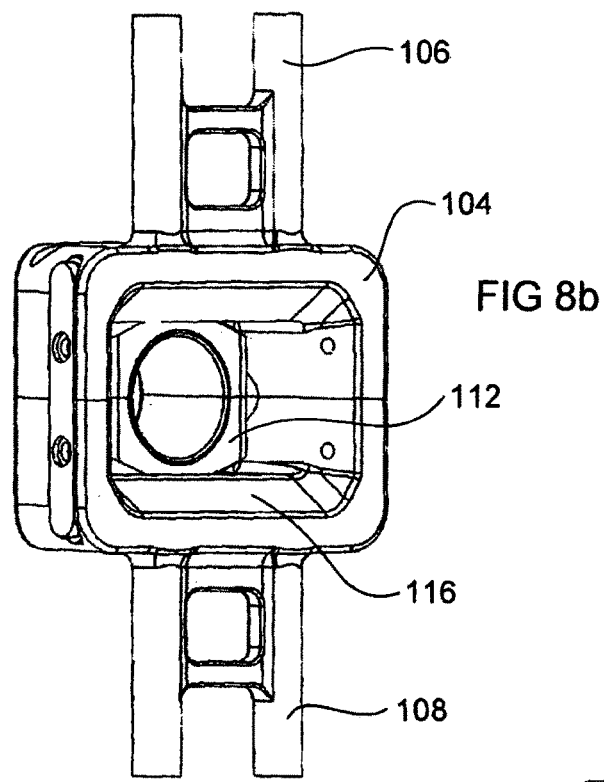
Figure 8C:
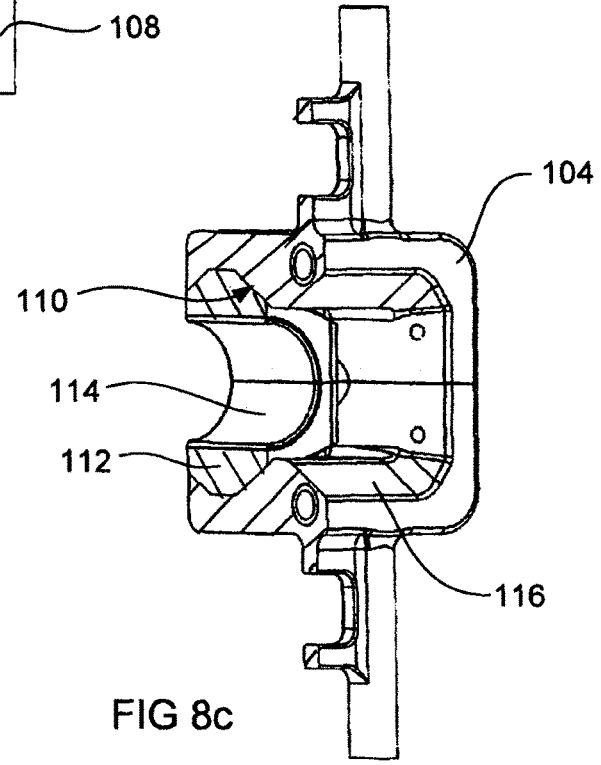
Figure 10:
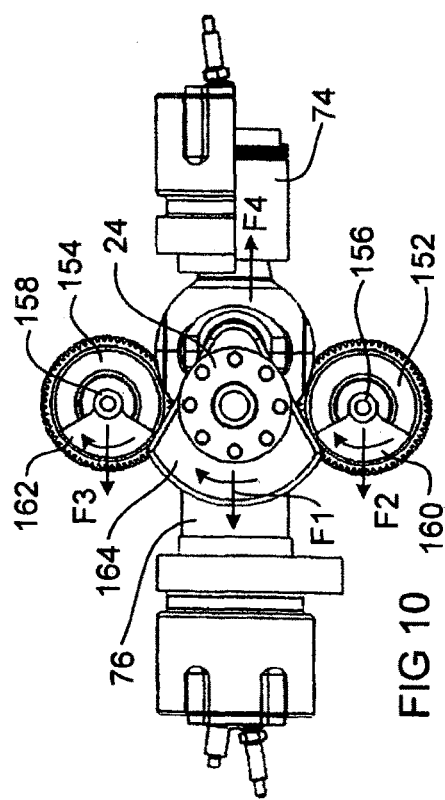

As shown in FIGS. 2, 3 and 10, a gear 150 is fixed on the front of the crankshaft 24 and drives two other gears 152 and 154 of the same diameter. Gears 152 and 154 are attached to respective balance shafts 156 and 158 and journalled on the crankcase (not shown) on the opposite side of crankshaft 24. Balance weights 162 and 162 are integral with respective balance shafts 156 and 158. Crankshaft 24 has integral balance weights 164 and 166 on opposite side of the crankpin 54. Balance weights 164 and 166 are designed to balance the effect of the crankpin 54 and half of the balance required to offset the shaking force of the reciprocating components comprising of the yoke 50, crosshead 58, pistons 74 and 76, mounting blocks 82 and 84, gudgeon pins 78 and 80 plus any journal bearings, pinning or bolting elements that form part of the reciprocating assembly. It is to be noted that the shaking force acts along the axis B-B only and therefore the effect of the balance weights 164 and 166 must be cancelled when the crankshaft 24 moves 90 degrees away from axis B-B.

FIGS. 10 to 13 depict the rotation of crankshaft 24 every 90 degrees in an anti-clockwise direction in the orientation seen in those Figures and show the positions of the balance weights on the crankshaft 24 and those of the balance shafts 156 and 158. FIG. 10 shows that when piston 74 is at top dead centre the combined force of the reciprocating components designated F4 is balanced by the combined force of the balance weights 160, 162, 164 and 166 represented respectively by F2, F3 and F1 (164 plus 166). Note that F1 represented by weights 164 and 166, is equal to F2 plus F3. Also balance weights 160 and 162 are of equal magnitude.

Figure 11:
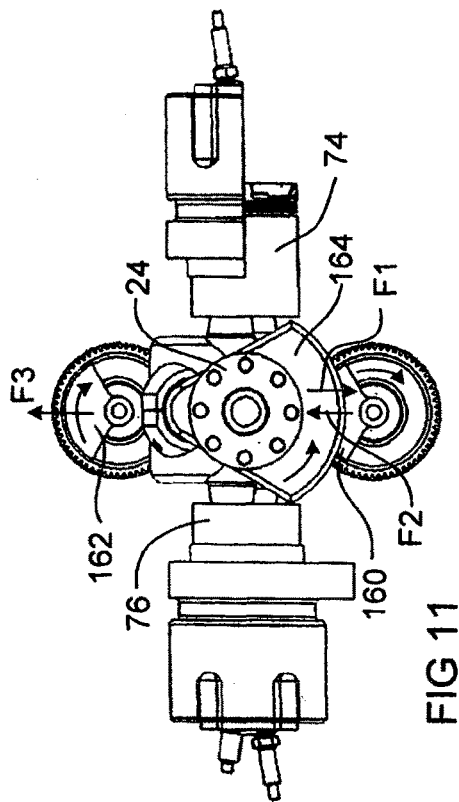
FIGS. 10 to 13 are rear views of an engine according to the invention, showing positions of components at successive 90 degrees intervals in a firing cycle.

With piston 74 at mid stroke and the crankshaft 24 rotated anti-clockwise by 90 degrees from the position of FIG. 10, as shown in FIG. 11, the reciprocating force F4 is zero and, accordingly, the effects of the balance weights must also be zero. In this position balance weights 160 and 162 have moved clockwise relative to balance weights 164 and 166 on crankshaft 24, and the net effect of F1−F2−F3=zero.

Figure 12:
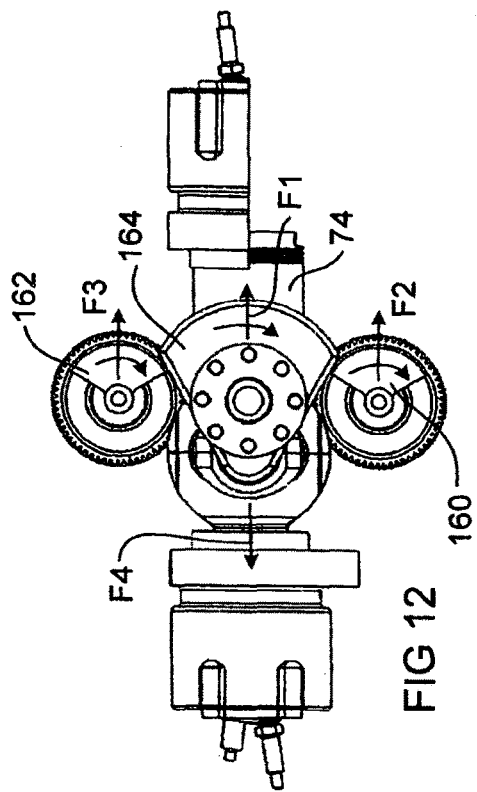

With piston 74 at bottom dead centre and the crankshaft rotated a further 90 degrees from the position of FIG. 11, as shown in FIG. 12, the reciprocating force F4 is at its maximum in the opposite direction. In this position balance weights 160 and 162 have rotated a further 90 degrees clockwise and the direction of the balance forces F2 and F3 align with force F1 and counteract force F4.

Figure 13:
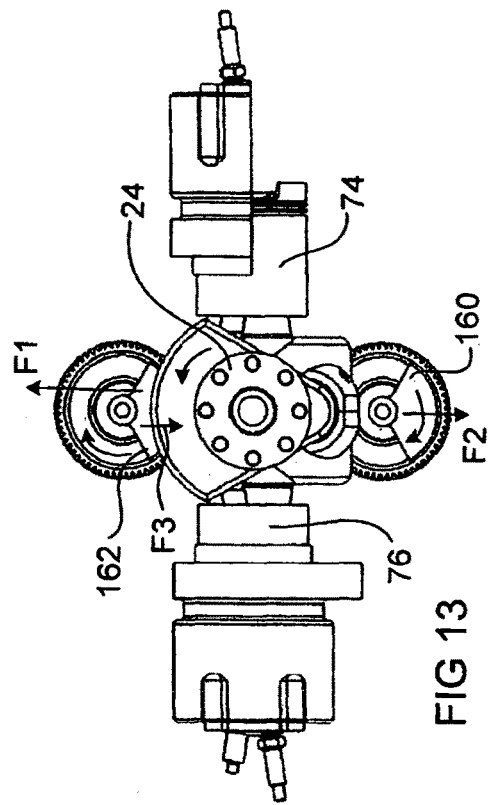

FIG. 13 illustrates the piston 74 at mid-stroke after the crankshaft 24 has rotated a further 90 degrees from the position of FIG. 12 and with the piston 74 at mid stroke. Again, the force F4 of reciprocating components is zero and force F1 is balanced by the combination of force F2 plus force F3.

In some applications it is possible to eliminate the need for balance shafts while still achieving an acceptable level of unbalance if the mass of the crosshead-yoke interface approaches the combined mass of the two pistons.

Figure 14:
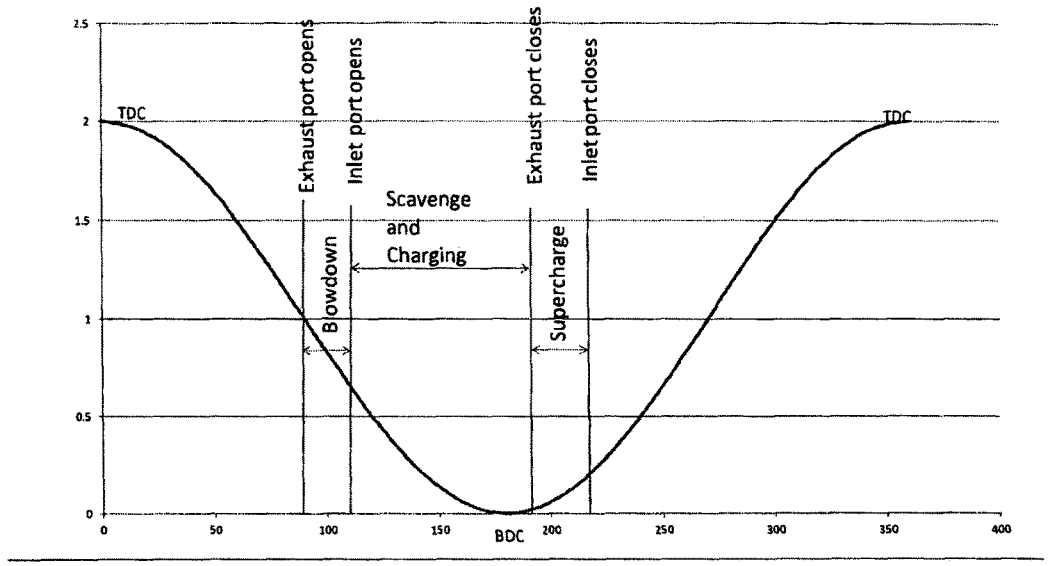
FIG. 14 is a graphical representation of preferred operation with a preferred form of engine according to the invention.

FIG. 14 shows the true sinusoidal movement of each piston in an engine according to the present invention through one revolution of the engine and the opening and closing position of the inlet and exhaust ports. The elliptical movement of the piston and the positioning of the inlet and exhaust slots around the piston crown determine the opening and closing period of the inlet and exhaust ports. These positions are so designed to produce the opening of the exhaust ports ahead of the inlet ports on the downward movement of the piston, and for the exhaust port to close ahead of the inlet port on the upward movement of the piston. This condition is termed asymmetrical port timing and is a necessary feature for an efficient two-stroke engine.

Figure 15:
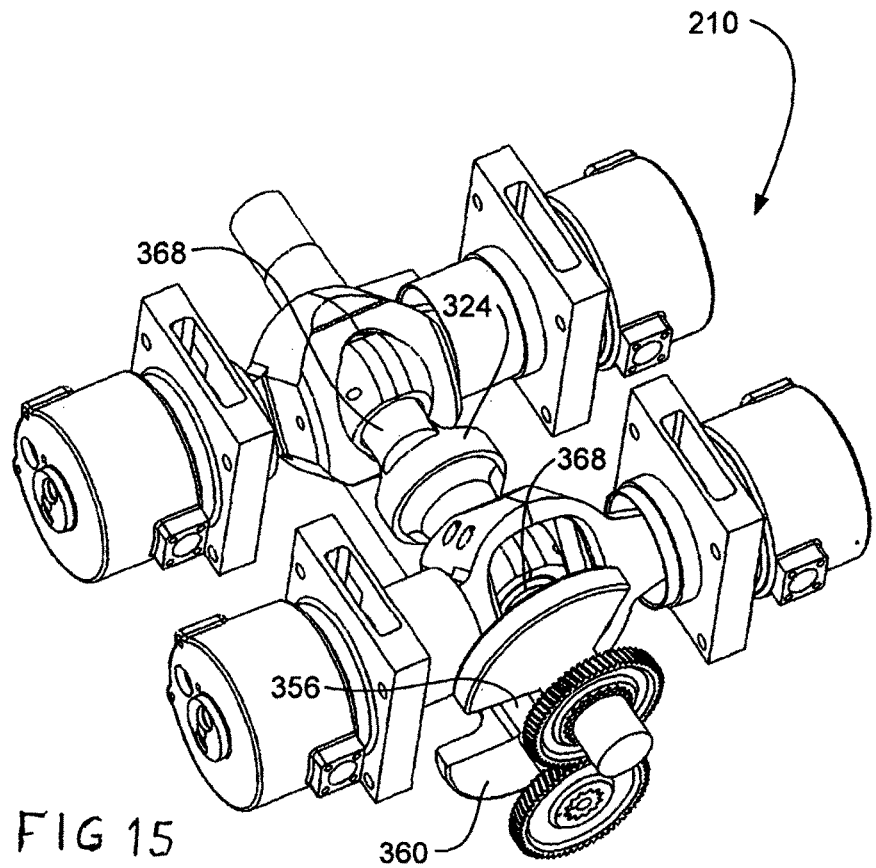
FIG. 15 shows a four cylinder two-stroke engine according to a fourth embodiment of the invention.

FIG. 15 is a four cylinder version of the present invention engine 210 in which two complete engines as described in engine 10 are connected back to back, with the crankpins 368 of the respective crankshafts 324 displaced by 180 degrees. In this arrangement only one balance shaft 356 with balance weight 360 is required.

Multi cylinder configuration can also be achieved with front-to-front attachment- and further banks of cylinders.

It is to be understood that although the present invention has been described with reference to two-stroke engines, the mechanism also can be applied to four stroke engines to produce compact boxer engine layouts. With such four stroke engines the associated heads with poppet valves and camshaft drives can be provided in a conventional manner.

Figure 16:
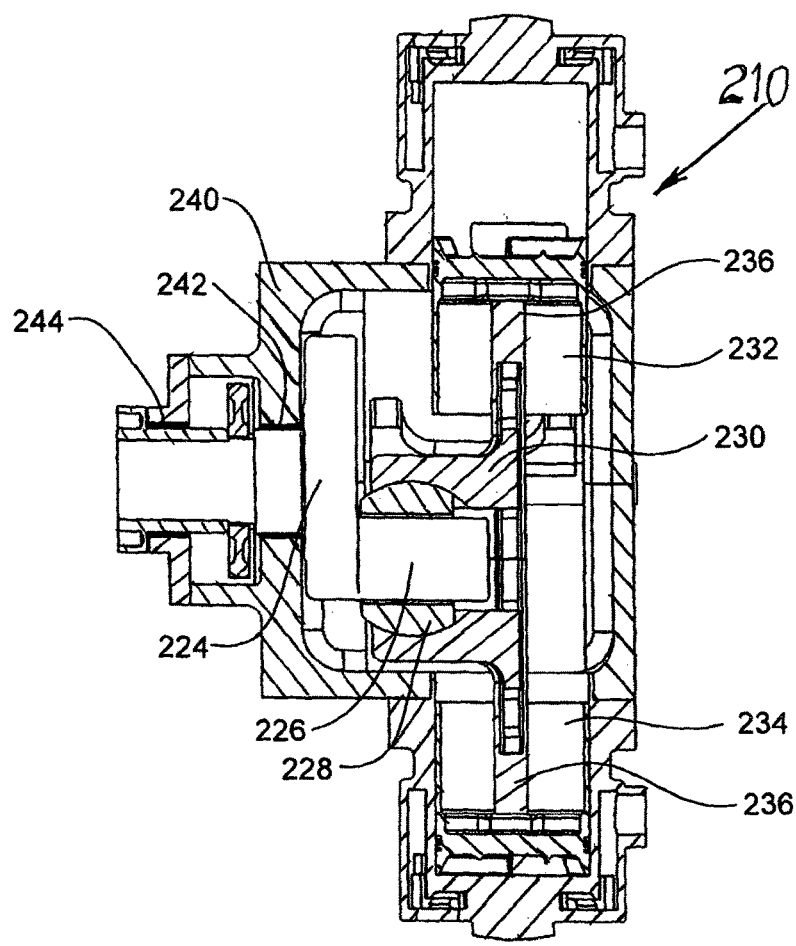
FIG. 16 is an isometric cross-section of an engine according to a fifth embodiment of the invention.
Figure 17:
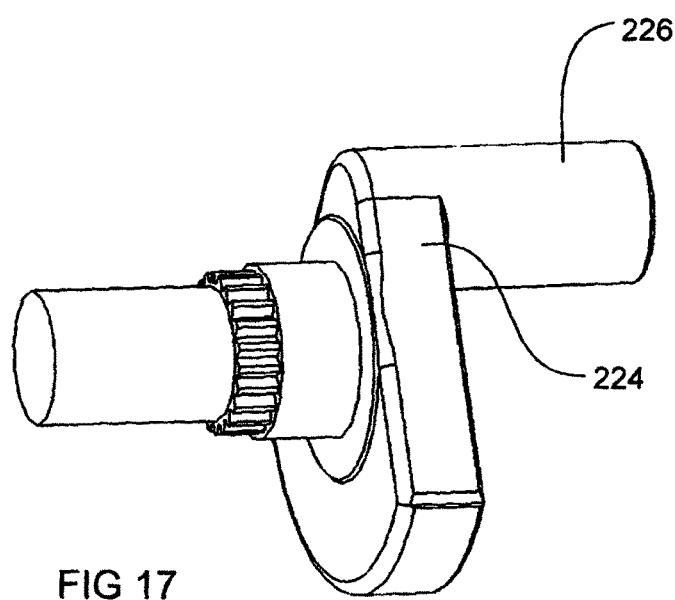
FIG. 17 is an isometric perspective view of a component of the engine of FIG. 16.

In a further embodiment, FIG. 16 shows an engine 210 in which the crank 224 has a crankpin 226 that, via arms 236 of crosshead 230 and yoke 228, connect to the pistons 232 and 234, There are numerous structural method of achieving such connections, as evident from previous embodiments. A principal difference illustrated by FIG. 16 is that the crankshaft 224, shown more fully in FIG. 17, is supported at only one end in crankcase 240. As seen in FIG. 17, the crankshaft 224 has only the one journalled end section from which crankpin 226 projects, and that end section is supported by two journal bearings 242 and 244 that are spaced apart to provide adequate support. In addition, the space between the two journal bearings 242 and 244 is used to provide drive gears to the two balance shafts in a similar manner to that described in engine 10.

Figure 20:
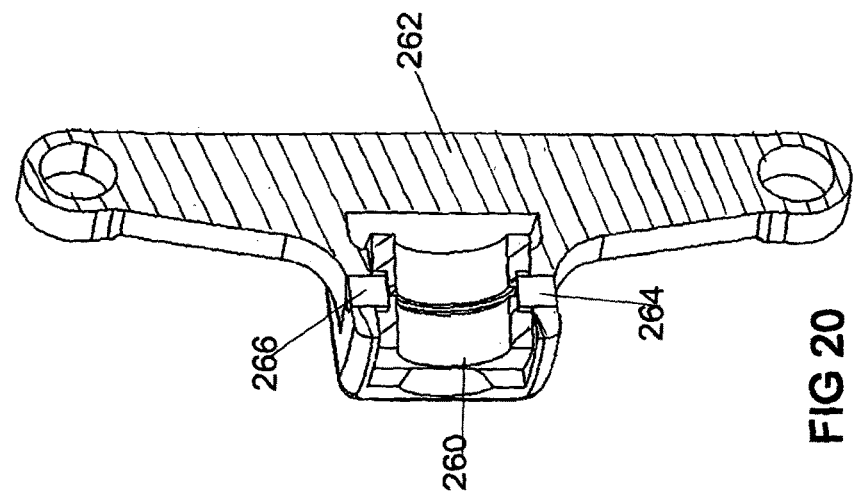
FIG. 20 corresponds to FIG. 19, but shows assembled components of a variant of the arrangements of FIG. 18 for a seventh embodiment of a two-stroke engine according to the invention.
Figure 19:
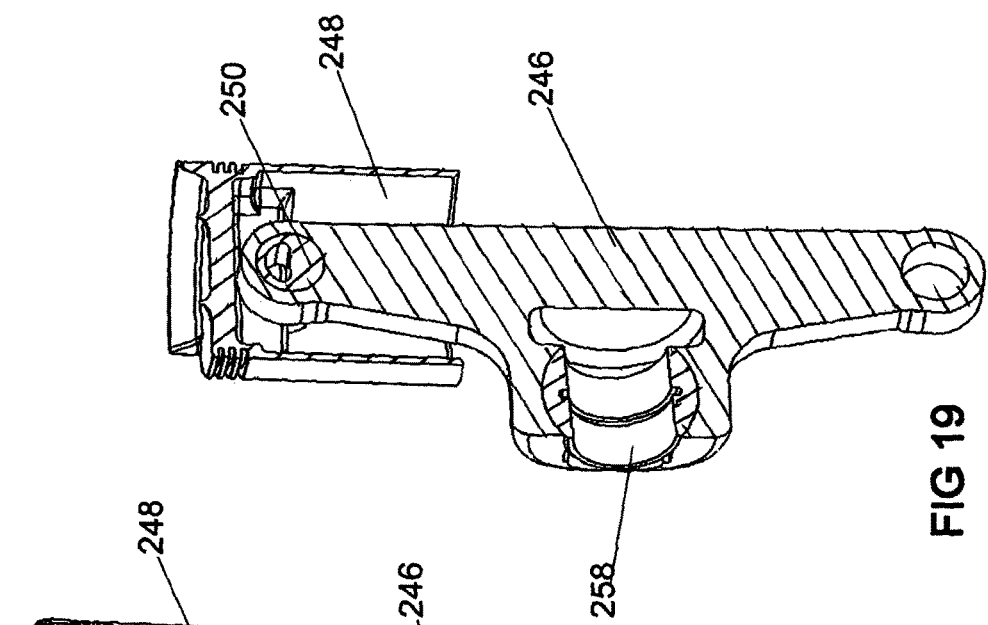
FIG. 19 is an isometric cross-section of the components of FIG. 18, after assembly.
Figure 18:
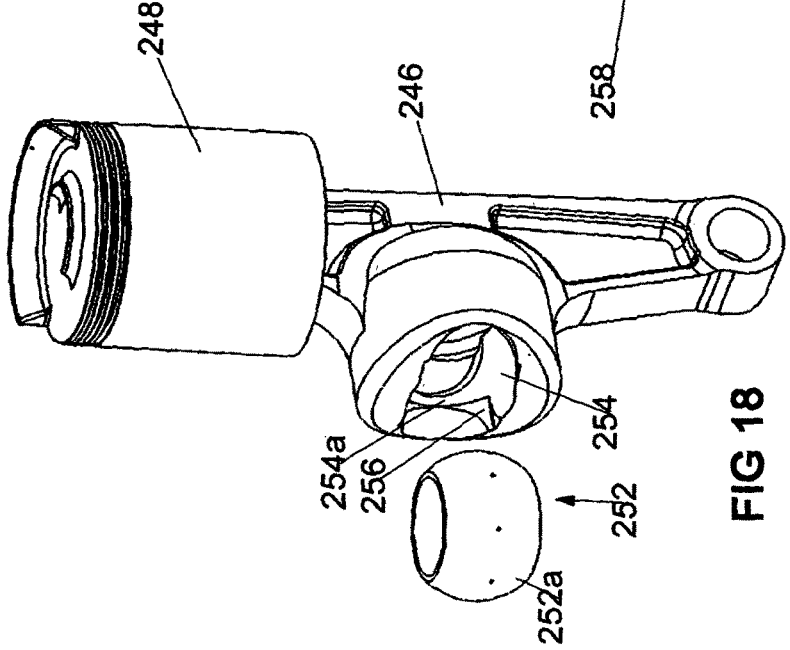
FIG. 18 is an isometric perspective view of unassembled components for a sixth embodiment of a two-stroke engine according to the invention.

Further structural methods for the single sided embodiment of FIG. 16 are shown in FIGS. 18 to 20. FIGS. 18 and 19 show a one-piece crosshead 246 coupled to a piston 248 by a gudgeon pin 250 in the normal manner. A similar piston (not shown) is attached on the opposite side. A one-piece annular yoke 252, that has a part spherical outer surface 252a, is inserted sideways, as shown, into a cavity 254 of crosshead 246 via two slots 256 cut half-way into a part-spherical internal surface 254a of cavity 254 of crosshead 246. Once the yoke 252 is inserted into the cavity 254 of crosshead 246, yoke 252 then is rotated to align the bore 258 of yoke 252 with the crankshaft (not shown). In this position the yoke 252 is captured in spherical cavity 254 and allowed to move in all directions as required by the movement of the crosshead 246 in an engine.

FIG. 20 shows an alternative to the arrangement of FIG. 19. The arrangement of FIG. 20, like that of FIG. 19, has a one-piece crosshead 262 to be coupled to two pistons (not shown). However, in this instance, the spherical yoke 252 of FIG. 19 has been replaced by a flat bearing yoke 260 able to move by the required angle and located into the crosshead 262 by pins 264 and 266.

Figure 21:
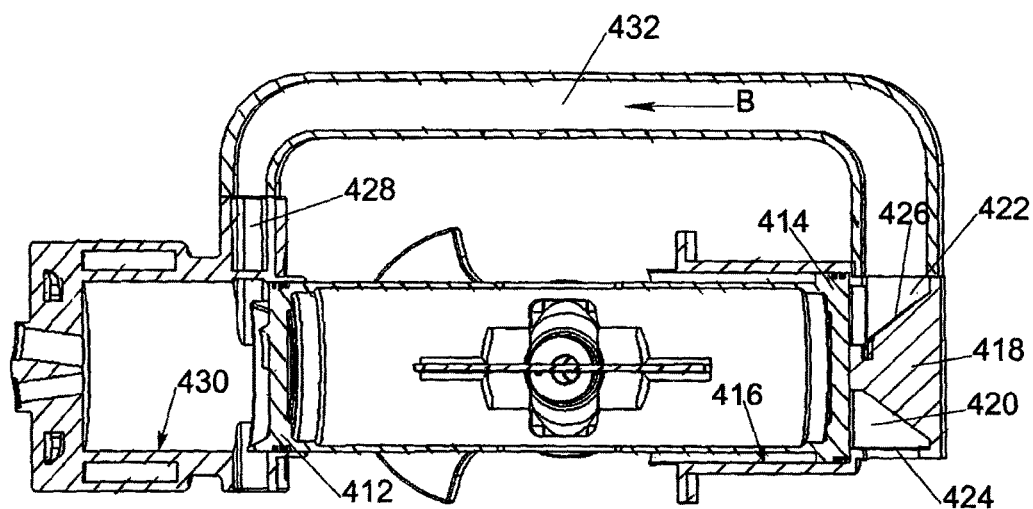
FIG. 21 is a cross-sectional view of a eighth embodiment of a two-stroke engine according to the invention.
Figure 22:
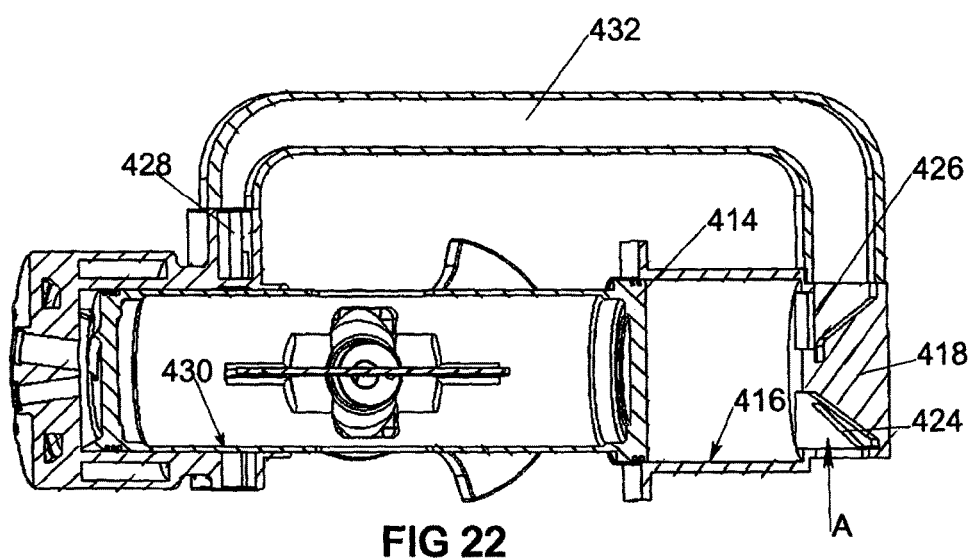
FIG. 22 corresponds to FIG. 21, but shows the engine of the eighth embodiment in a different positioning.

In the further embodiment of FIGS. 21 and 22, there is shown an engine 410 having a power piston 412 on one side and, on the opposite side, a compressor piston 414 that eliminates the need for a separate engine driven supercharger. The function of the power piston 412 is similar to the engine 10 described in FIGS. 1 to 7. The compressor piston 414 oscillates in a bore 416 and may be of a larger bore size to that of the bore of power piston 412. The head 418 of the compressor cylinder 416 contains two ports 420 and 422. Port 420 is the inlet port and port 422 is the outlet port. The closing and opening of port 420 and of port 422 is controlled by reed valves 424 and 426, respectively.

During the induction stroke, reed valve 424 at the inlet port 420 is open and reed valve 426 at the outlet port 422 is closed, Atmospheric air then is inducted (as shown by arrow A in FIG. 22), via a suitable filter (not shown). During the compression stroke shown in FIG. 21, reed valve 424 is closed and reed valve 426 at the outlet port 422 is opened under the pressure of the compressed air. The compressed air is transferred to the inlet port 428 of the power cylinder 430 by flow along duct 432 (as shown by arrow B). The volume inside the duct 432 also acts as an accumulator of compressed air after the inlet port 428 of the power cylinder 430 closes. In this configuration a compact engine is configured without the use of an external scavenge pump and supercharger.

The various embodiments described herein enable the provision of an opposed cylinder mechanism suited for a two-stroke internal combustion engine but also adaptable for use in a four stroke internal engine. In each case, the invention facilitates attainment of asymmetric port timing, while achieving this in a number of relatively simple arrangements that increase the range of uses for the engine.

The claims defining the invention are as follows:

1. An internal combustion engine comprising: a crankshaft having a crankpin to which each piston of an opposed pair of pistons is connected and by which the pistons reciprocate in a respective one of axially inline cylinders; a crosshead having opposite ends on which a respective one of the pistons is mounted; and a coupling between the crosshead and the crankpin to cause the pistons to oscillate circumferentially as the pistons reciprocate, each piston having a crown that co-operates with respective inlet and outlet ports of the inline cylinders, the crown including a segmented skirt projecting beyond the crown, the segmented skirt having two arcuate, circumferentially spaced skirts at opposite sides of the crown such that first opposing ends of the respective skirts form a first opening to define an inlet and second opposing ends of the respective skirts form a second opening to define an outlet, the coupling between the crosshead and the crankpin including a connector that is fitted on, and able to move along, the crankpin, the coupling between the crosshead and the crankpin being reversibly moveable along the crankpin, the coupling to engage the crosshead so as to be reversibly rotatable relative to the crosshead along an axis that is parallel to and laterally offset from a reciprocating axis along which the pistons reciprocate, the crosshead and the coupling to impart a partial rotary motion to the pistons as the pistons reciprocate in the inline cylinders, overall motion of the pistons to produce an elliptical path for each piston in the respective ones of the inline cylinders that, in combination with the crowns, enables asymmetric port timing.

2. The engine of claim 1, wherein the connector includes a yoke defining a bore through which the crankpin extends, the connector further including a bearing provided in the bore between the yoke and the crankpin.

3. The engine of claim 2, wherein the yoke includes a two-part body to enable the yoke to be fitted onto the crankpin.

4. The engine of claim 2, wherein the yoke includes a one piece body that defines the bore to receive the crankpin endwise.

5. The engine of claim 1, wherein the crosshead includes an offset crosshead, and the pistons are rigidly connected to the offset crosshead, the pistons being journalled on the crankshaft via a yoke that is offset relative to the reciprocating axis of the pistons.

6. The engine of claim 1, wherein the crosshead is an offset crosshead, and the crankshaft is a single throw crankshaft on which the opposed pair of pistons is flexibly connected via the offset crosshead, the pistons being journalled on the crankshaft via a yoke that is offset relative to the reciprocating axis of the pistons.

7. The engine of claim 4, wherein the yoke engages the crosshead via spherical bearing surfaces.

8. The engine of claim 5, wherein the yoke engages the crosshead via conical bearing surfaces.

9. The engine of claim 5, wherein the yoke engages the crosshead via flat bearing surfaces.

10. The engine of claim 1, further including a plurality of pairs of inline cylinders each with a respective pair of opposed pistons connected to the crankpin of the crankshaft via the crosshead and coupling.

11. The engine of claim 1, wherein the engine is operable in a two stroke mode.

12. The engine of claim 1, wherein the engine is operable in a four stroke mode.

13. The engine of claim 7, wherein the yoke is receivable into a cavity defined by the crosshead and then rotated to align with the bore and to align the yoke with the crankpin.

14. The engine of claim 1, wherein one piston of the opposed pair of pistons is operable as a power piston and the other piston of the opposed pair of pistons is operable as a compressor piston, the compressor piston having a compressor cylinder defining a bore size that is greater than a bore size of a cylinder of the power piston, the compressor cylinder having an inlet port and an outlet port with each of the inlet and outlet ports of the compressor cylinder being controlled by reed valves.

15. The engine of claim 14, wherein, during an induction stroke, the inlet port of the compressor cylinder is open to atmospheric air and the outlet port of the compressor cylinder is closed, and during a compression stroke the inlet port of the compressor cylinder is closed and the outlet port of the compressor cylinder is open under pressure of compressed air, the engine including a duct by which compressed air is transferred to the inlet port of the power cylinder, the duct having a volume to provide an accumulator of compressed air after the inlet port of the power cylinder closes.

\* \* \* \* \*